US009664541B2

(12) United States Patent
Otani et al.

(10) Patent No.: US 9,664,541 B2
(45) Date of Patent: May 30, 2017

(54) VEHICLE INSTRUMENT

(71) Applicant: Yazaki Corporation, Tokyo (JP)

(72) Inventors: Akihiro Otani, Shizuoka (JP); Kouhei Takeshita, Shizuoka (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 119 days.

(21) Appl. No.: 14/867,631

(22) Filed: Sep. 28, 2015

(65) Prior Publication Data
US 2016/0091346 A1    Mar. 31, 2016

(30) Foreign Application Priority Data

Sep. 30, 2014    (JP) ................................ 2014-200574

(51) Int. Cl.
| | |
|---|---|
| G01D 11/28 | (2006.01) |
| G02B 5/02 | (2006.01) |
| F21V 8/00 | (2006.01) |

(52) U.S. Cl.
CPC ........... *G01D 11/28* (2013.01); *G02B 5/0226* (2013.01); *G02B 6/0016* (2013.01)

(58) Field of Classification Search
CPC ..... G01D 11/28; G02B 5/0226; G02B 6/0016
USPC .................................................... 362/23.16
See application file for complete search history.

(56) References Cited

U.S. PATENT DOCUMENTS

| | | | | |
|---|---|---|---|---|
| 5,458,082 A | * | 10/1995 | Cookingham | G01D 11/28 116/288 |
| 5,949,346 A | * | 9/1999 | Suzuki | B60K 37/02 116/286 |
| 6,045,233 A | * | 4/2000 | Iwai | G01D 11/28 116/202 |
| 6,461,006 B1 | * | 10/2002 | Matumoto | G01D 11/28 362/23.16 |
| 6,714,126 B2 | * | 3/2004 | Wada | B60K 37/02 116/286 |
| 7,066,630 B1 | * | 6/2006 | Venkatram | G01D 7/04 362/23.16 |
| 7,150,906 B2 | * | 12/2006 | Iwase | G09F 13/08 362/23.18 |
| 2001/0001565 A1 | * | 5/2001 | Brandt | G01D 7/002 349/11 |

(Continued)

FOREIGN PATENT DOCUMENTS

JP    2006-126048 A    5/2006

*Primary Examiner* — Bryon T Gyllstrom
(74) *Attorney, Agent, or Firm* — Sughrue Mion, PLLC

(57) ABSTRACT

A vehicle instrument includes: a three-dimensional object which is formed of a light transmitting material and is formed so as to protrude from a surface displaying a measurement value involved with a vehicle; and a light source which emits light to the three-dimensional object, wherein the three-dimensional object includes a portion having a different protrusion amount from a light incident surface to which light emitted from the light source is incident, and the light incident surface of the portion having a relatively small protrusion amount from the light incident surface is provided with a high-diffusion portion having a relatively large diffusion degree for the incident light compared with the light incident surface of the portion having a relatively large protrusion amount from the light incident surface.

20 Claims, 7 Drawing Sheets

(56) References Cited

U.S. PATENT DOCUMENTS

| | | | | |
|---|---|---|---|---|
| 2002/0001183 A1* | 1/2002 | Shigehiro | ............... | B60Q 3/14 362/23.01 |
| 2002/0135995 A1* | 9/2002 | Fujita | ................... | G01D 13/265 362/23.2 |
| 2005/0128733 A1* | 6/2005 | Clugston | ................ | G01D 11/28 362/23.16 |
| 2013/0027902 A1* | 1/2013 | Miyazawa | ............ | G01D 11/28 362/23.14 |
| 2013/0314891 A1* | 11/2013 | Miyazawa | ........... | G01D 13/265 362/23.14 |

* cited by examiner

WIDTH DIRECTION
RIGHT SIDE ←→ LEFT SIDE

VEHICLE INSTRUMENT

CROSS-REFERENCE TO RELATED APPLICATION(S)

The present application claims priority to and incorporates by reference the entire contents of Japanese Patent Application No. 2014-200574 filed in Japan on Sep. 30, 2014.

BACKGROUND OF THE INVENTION

1. Field of the Invention

The present invention relates to a vehicle instrument.

2. Description of the Related Art

As a conventional vehicle instrument mounted on a vehicle, for example, Japanese Patent No. 4671099 discloses an instrument device that includes an indicating needle, a display board provided with an index as an indicating target of the indicating needle, and a cylindrical member disposed at the front side of the display board and surrounding the operation range of the indicating needle. The instrument device includes a plurality of light transmitting members provided at the front side of the display board and each formed as a three-dimensional structure emitting light by receiving light from a light source and an accommodation portion accommodating the light transmitting members in a cylindrical member while a part of the light transmitting members protrudes from the cylindrical member.

Incidentally, the instrument device disclosed in Japanese Patent No. 4671099 has a tendency that the light transmitting member forming a protrusion-shaped scale is formed so that the attenuation amount of the straight light incident from a light incident surface, transmitted through a portion having a relatively large protrusion amount, and emitted therefrom relatively increases and the attenuation amount of the straight light incident from the light incident surface, transmitted through a portion having a relatively small protrusion amount, and emitted therefrom relatively decreases. For this reason, the instrument device has a tendency that the portion having a relatively large protrusion amount in the light transmitting member is relatively dark and the portion having a relatively small protrusion amount is relatively bright. Accordingly, there is a concern that unevenness in brightness may occur.

SUMMARY OF THE INVENTION

The invention is made in view the above-described circumstance, and an object of the invention is to provide a vehicle instrument capable of suppressing unevenness in brightness.

The above object of the present invention is achieved by the following configurations.

According to one aspect of the present invention, a vehicle instrument includes a three-dimensional object which is formed of a light transmitting material and is provided so as to protrude from a surface displaying a measurement value involved with a vehicle; and a light source configured to emit light to the three-dimensional object. Herein, the three-dimensional object includes a portion having a different protrusion amount from a light incident surface to which light emitted from the light source is incident, and the light incident surface of a portion having a relatively small protrusion amount from the light incident surface is provided with a high-diffusion portion having a relatively large diffusion degree for the incident light compared with the light incident surface of a portion having a relatively large protrusion amount from the light incident surface.

In the vehicle instrument according to another aspect of the present invention, the high-diffusion portion is formed so that a surface roughness of the light incident surface of the portion having a relatively small protrusion amount from the light incident surface is relatively larger than the surface roughness of the light incident surface of the portion having a relatively large protrusion amount from the light incident surface.

In the vehicle instrument according to still another aspect of the present invention, the high-diffusion portion is composed of a grained surface.

In the vehicle instrument according to still another aspect of the present invention, the three-dimensional object is a plurality of protrusion-shaped scales provided so as to correspond to the measurement value and indicated by an indicating needle.

The vehicle instrument according to still another aspect of the present invention further includes a light guide body configured to guide light emitted from the light source to the three-dimensional object. Herein, the three-dimensional object and the light guide body are integrally formed of dark-color semi-transparent material.

The vehicle instrument according to still another aspect of the present invention further includes a dial plate configured to cover a surface opposite to the light source of the light guide body. Herein, at least a part of the three-dimensional object is located at the opposite side to the light guide body of the dial plate.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of the invention will be described in detail with reference to the drawings. Furthermore, the invention is not limited to the embodiment. Further, the components of the embodiment below include a component which can be easily replaced by the person skilled in the art or a component which has substantially the same configuration.

Embodiment

Figure 1:
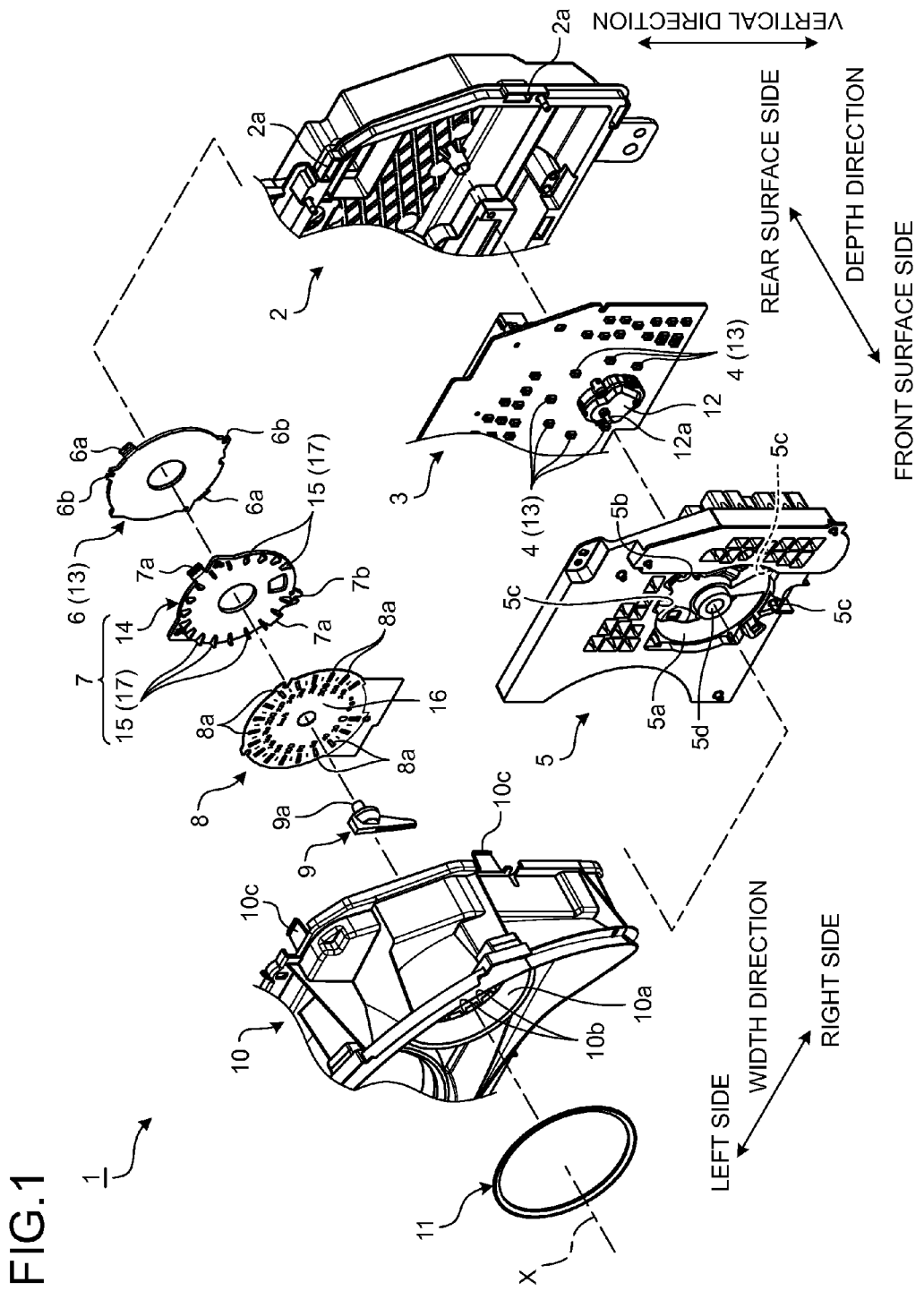
FIG. 1 is an exploded perspective view illustrating a schematic configuration of a vehicle instrument according to an embodiment.
Figure 2:
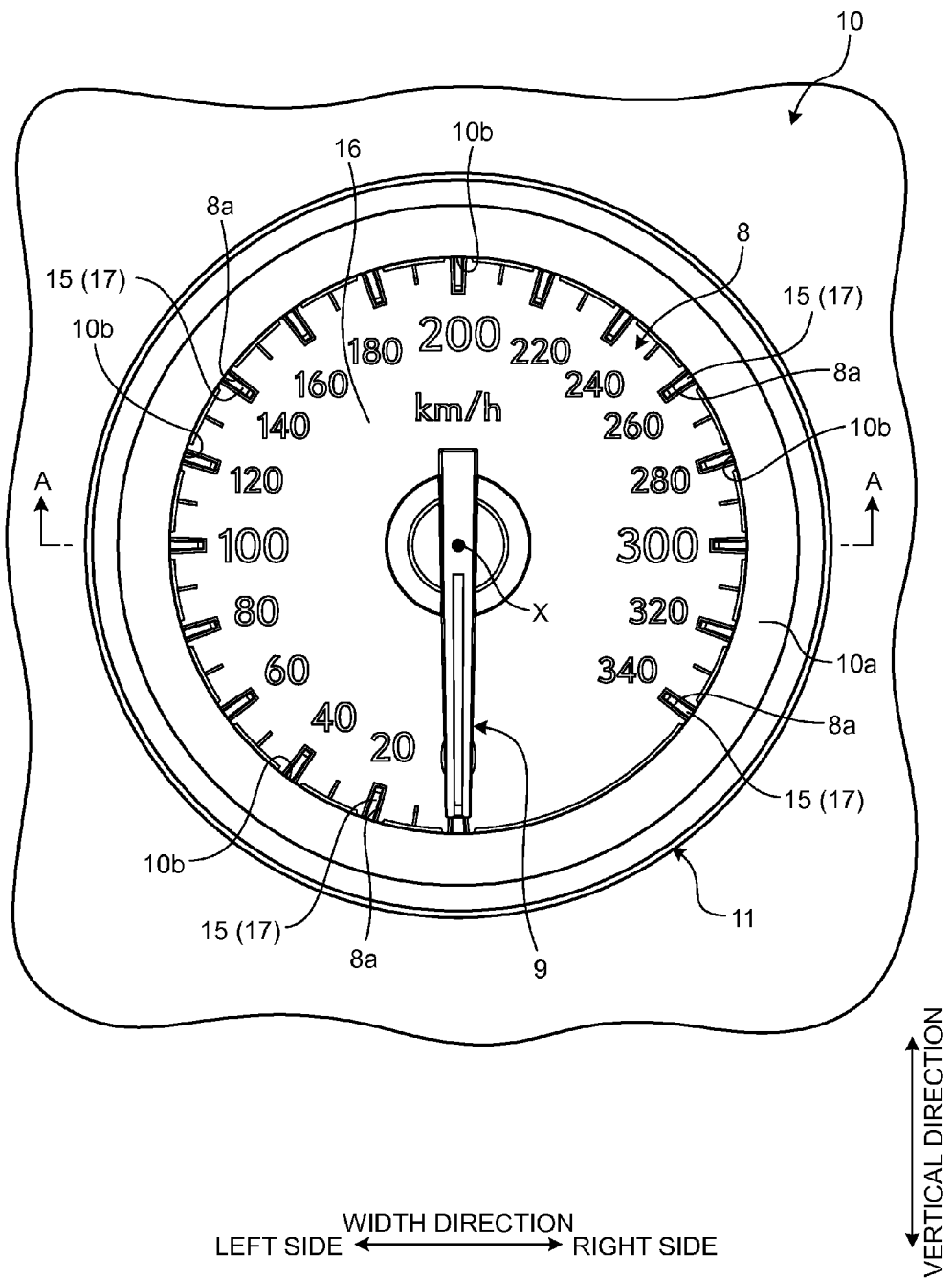
FIG. 2 is a front view of the vehicle instrument according to the embodiment.
Figure 3:
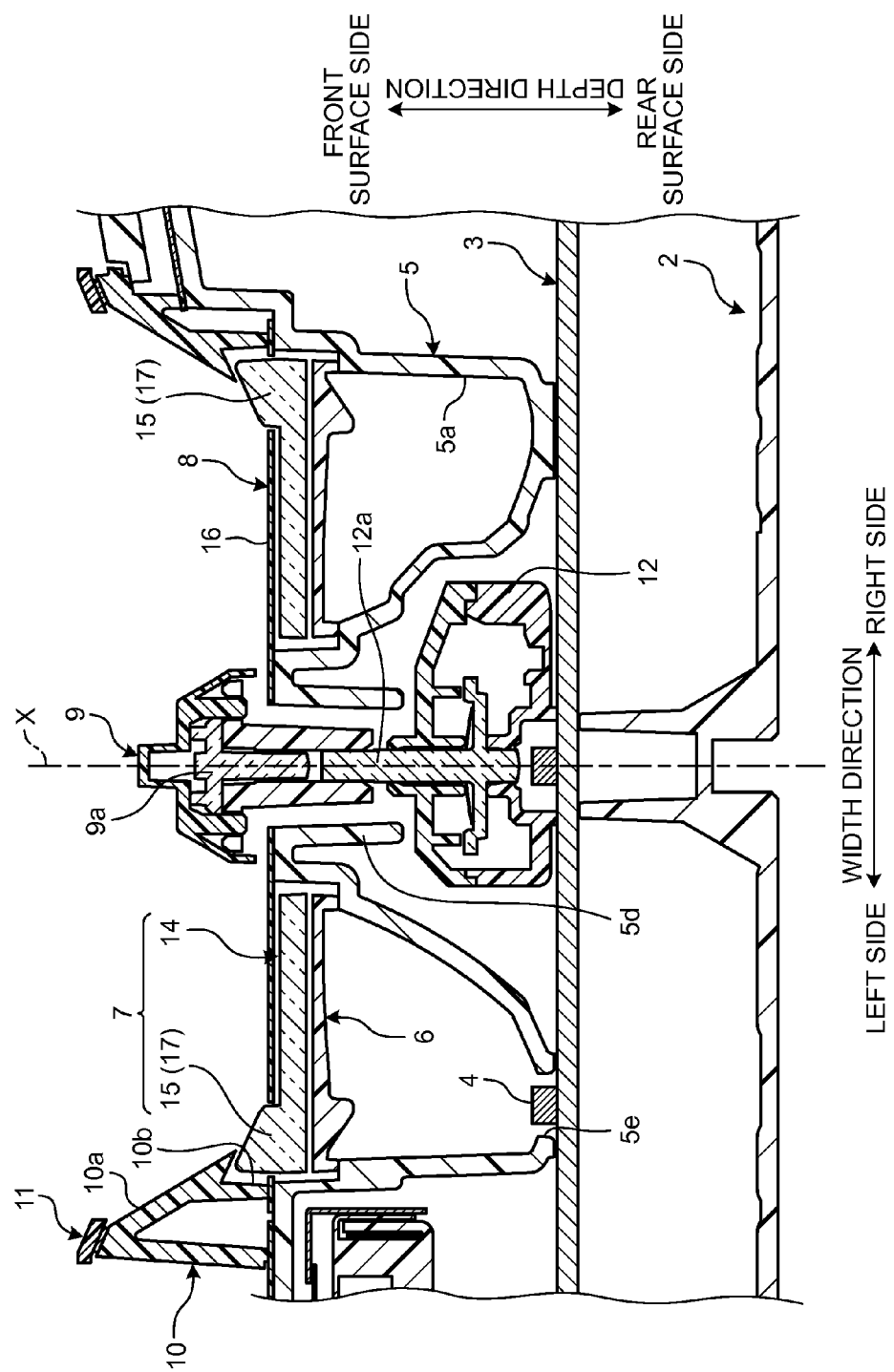
FIG. 3 is a cross-sectional view taken along the line A-A of FIG. 2.
Figure 4:
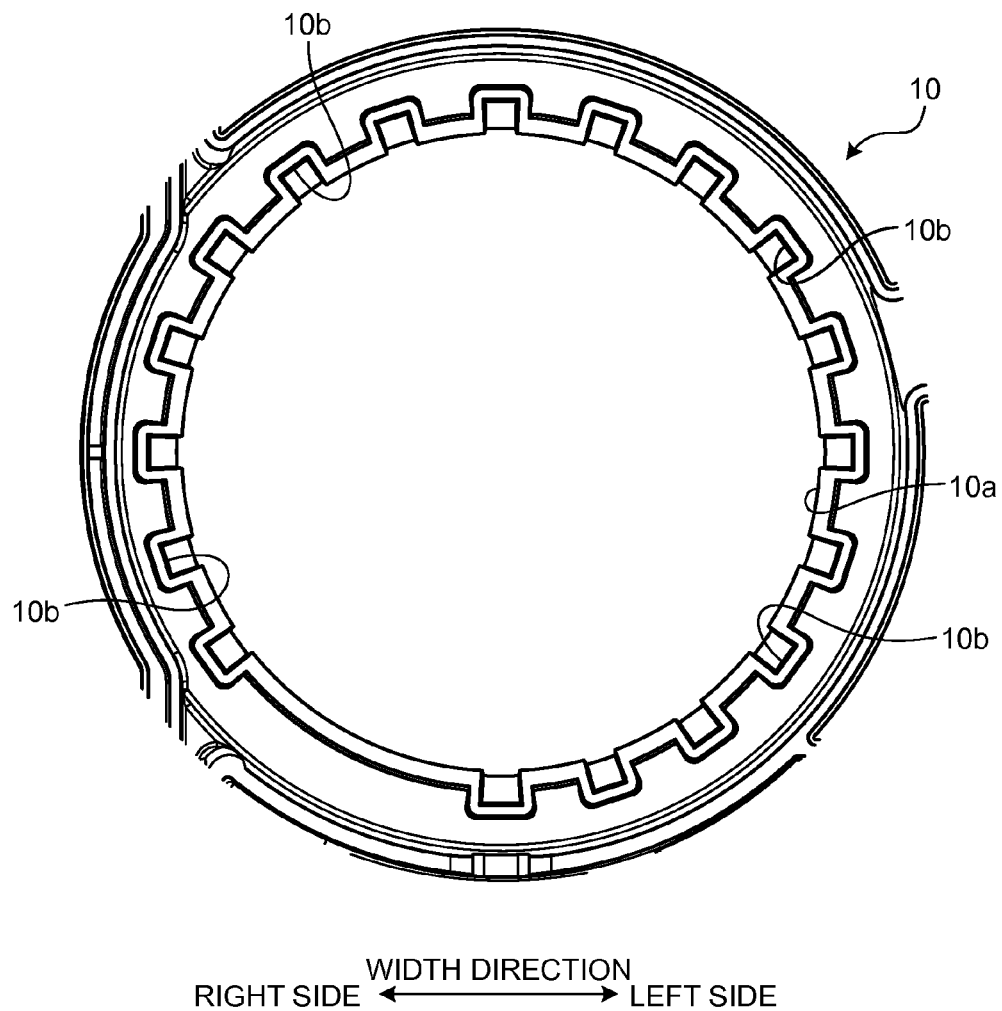
FIG. 4 is a rear view of a facing member of the vehicle instrument according to the embodiment.
Figure 5:
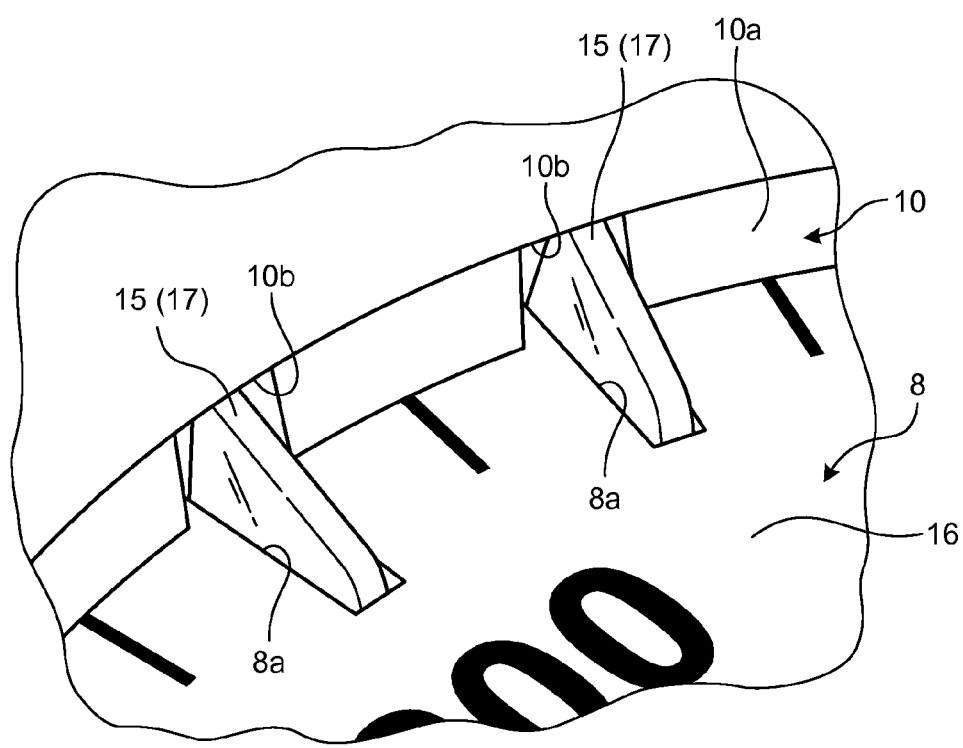
FIG. 5 is a partially perspective view including a facing member notch and a three-dimensional object of the vehicle instrument according to the embodiment.
Figure 6:
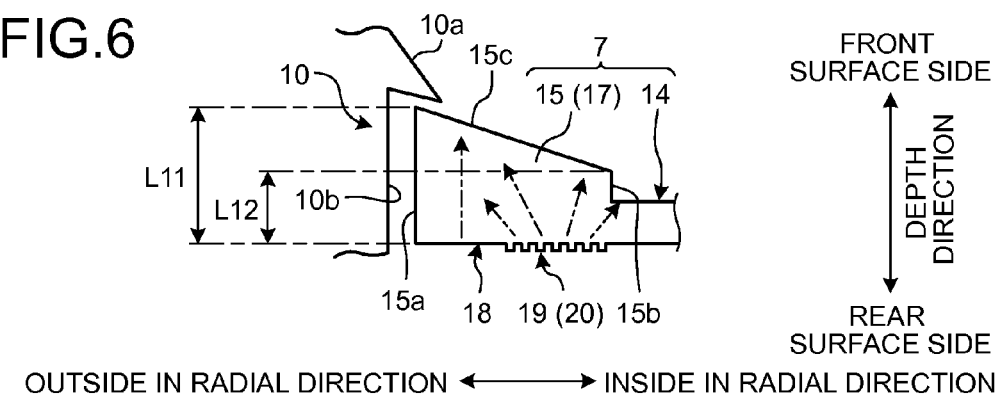
FIG. 6 is a partially cross-sectional view schematically illustrating a three-dimensional object and a high-diffusion portion of the vehicle instrument according to the embodiment.
Figure 7:
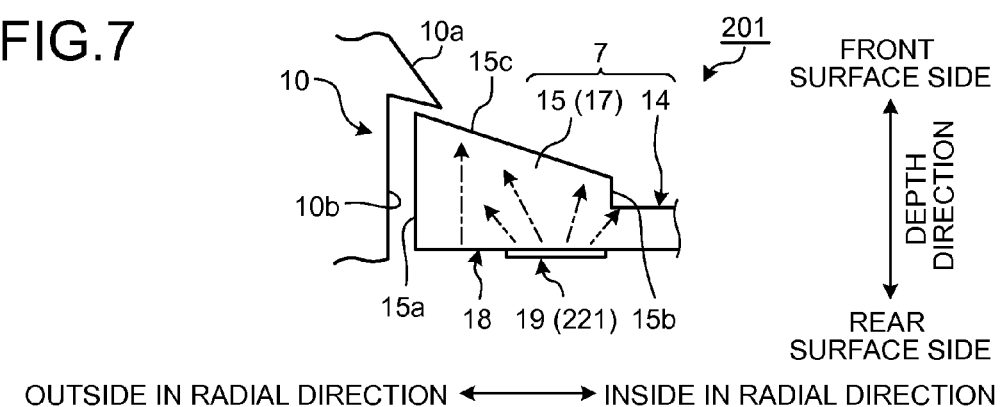
FIG. 7 is a partially cross-sectional view schematically illustrating a three-dimensional object and a high-diffusion portion of a vehicle instrument according to a modified example.

FIG. 1 is an exploded perspective view illustrating a schematic configuration of a vehicle instrument according to an embodiment. FIG. 2 is a front view of the vehicle instrument according to the embodiment. FIG. 3 is a cross-sectional view taken along the line A-A of FIG. 2. FIG. 4 is a rear view of a facing member of the vehicle instrument according to the embodiment. FIG. 5 is a partially perspective view including a facing member notch and a three-dimensional object (a protrusion-shaped scale) of the vehicle instrument according to the embodiment. FIG. 6 is a partially cross-sectional view schematically illustrating a three-dimensional object (a protrusion-shaped scale) and a high-diffusion portion of the vehicle instrument according to the embodiment. FIGS. 7, 8, 9, 10, 11, and 12 are partially cross-sectional views schematically illustrating a three-dimensional object (a protrusion-shaped scale) and a high-diffusion portion of a vehicle instrument according to a modified example.

A vehicle instrument 1 according to the embodiment illustrated in FIGS. 1, 2, 3, 4, 5, and 6 is mounted on a vehicle so as to display a measurement value of a vehicle. Here, the vehicle instrument 1 is mounted on, for example, an instrument panel provided in a dashboard of the vehicle, and is applied to a part of a vehicle display device (an in-vehicle instrument) that displays various information items involved with the vehicle as information items provided for an operation of driving the vehicle.

Furthermore, the width direction of the vehicle instrument 1 illustrated in FIG. 1 and the like typically corresponds to the vehicle width direction of the vehicle that employs the vehicle instrument 1. In the description below, it is assumed that the left side (the inner side of FIG. 1) is defined as the left side in the width direction and the right side (the outer side of FIG. 1) is defined as the right side in the width direction when a driver faces the front surface of the vehicle instrument 1 in the width direction of the vehicle instrument 1. Typically, the left side in the width direction corresponds to the assistant seat side of the vehicle, and the right side in the width direction corresponds to the driver seat side of the vehicle. Further, the depth direction of the vehicle instrument 1 illustrated in FIG. 1 typically corresponds to the front to back direction of the vehicle that employs the vehicle instrument 1. The depth direction typically corresponds to an optical axis direction of a light source 4. Further, the front surface side of the vehicle instrument 1 indicates the side facing the driver seat of the vehicle, that is, the vehicle interior side. Typically, the front surface side indicates the side which is visually recognized by the driver sitting on the driver seat. Meanwhile, the rear surface side of the vehicle instrument 1 indicates the opposite side to the front surface side in the depth direction, that is, the vehicle exterior side. Typically, the rear surface side indicates the side which is accommodated inside the instrument panel. Further, the directions used in the description below respectively indicate the directions in a state where the vehicle instrument 1 is assembled to the instrument panel unless otherwise specified.

Specifically, the vehicle instrument 1 includes a casing 2, a circuit board 3, a light source 4, an intermediate casing 5, a diffuser 6, a scale prism 7, a dial plate 8, an indicating needle 9, a facing member 10, and an annular decoration member 11 as illustrated in FIGS. 1, 2, 3, 4, and 5. The vehicle instrument 1 has a structure in which the casing 2, the circuit board 3, the light source 4, the intermediate casing 5, the diffuser 6, the scale prism 7, the dial plate 8, the indicating needle 9, the facing member 10, and the annular decoration member 11 are sequentially stacked in a direction from the rear surface side toward the front surface side in the depth direction. The vehicle instrument 1 displays various measurement values involved with the vehicle by using the light emitted from the light source 4. Here, an exemplary case will be described in which the vehicle instrument 1 is a vehicle analog speedometer configured to display a vehicle travel speed as a measurement value of a vehicle. Furthermore, the vehicle instrument 1 may have a structure in which a transmissive cover member formed as a light transmitting member is provided in the facing member 10 at the front surface side in the depth direction.

The casing 2 forms a part of the casing that accommodates various components constituting the vehicle instrument 1. Here, the casing 2 of the vehicle instrument 1 serves as the casing of the entire vehicle display device that employs the vehicle instrument 1. That is, a part of the casing of the vehicle display device is used as the casing 2 of the vehicle instrument 1. The casing 2 is formed of resin.

The circuit board 3 is used to mount various electronic components and wirings for realizing various functions in the vehicle instrument 1. The circuit board 3 includes a drive motor 12 and the like for driving the indicating needle 9 along with the electronic components and the wirings. A rotor shaft (rotation shaft) 12a of the drive motor 12 protrudes toward the front surface side in the depth direction (see FIG. 3 and the like). In the vehicle instrument 1, the center axis of the rotor shaft 12a becomes the rotation axis X of the indicating needle 9. Here, the circuit board 3 also serves as the circuit board of the entire vehicle display device that employs the vehicle instrument 1. That is, a part of the circuit board of the vehicle display device is used as the circuit board 3 of the vehicle instrument 1. The circuit board 3 is assembled to the casing 2 by a fixing member such as a screw.

The light source 4 is used to emit light toward the front surface side in the depth direction (the installation side of the diffuser 6, the scale prism 7, and the like). The light source 4 emits light from the rear surface side in the depth direction like the diffuser 6, the scale prism 7, and the dial plate 8. The light source 4 is configured as, for example, an LED (Light Emitting Diode) element, but the invention is not limited thereto. The light source 4 is mounted on the circuit board 3, and the driving thereof is controlled. Here, a plurality of (in FIG. 1, seven) light sources 4 is provided at an interval in a circular-arc shape about the rotor shaft 12a of the drive motor 12.

The intermediate casing 5 is a casing used to hold the diffuser 6, the scale prism 7, and the like. Here, the intermediate casing 5 serves as a telltale casing of the entire vehicle display device that employs the vehicle instrument 1. That is, a part of the telltale casing of the vehicle display device is used as the intermediate casing 5 of the vehicle instrument 1. The intermediate casing 5 is formed of resin. The intermediate casing 5 is formed so that the front surface side in the depth direction is provided with a holding concave portion 5a used to hold the diffuser 6, the scale prism 7, the dial plate 8, and the like. Here, since the diffuser 6 and the scale prism 7 are substantially formed in an annular shape as will be described later, the holding concave portion 5a is formed as a substantially annular recess which is formed in response to the shapes of the diffuser 6, the scale prism 7, the dial plate 8, and the like. The intermediate casing 5 is provided with an engagement concave portion 5b or a positioning concave portion 5c which communicates with the outer circumferential side of the holding concave portion 5a. The engagement concave portion 5b holds the diffuser 6 and the scale prism 7 inside the holding concave portion 5a by the engagement of engagement claws 6a and 7a of the diffuser 6 and the scale prism 7. The positioning concave portion 5c positions the diffuser 6 and the scale prism 7 to a predetermined position inside the holding concave portion 5a by the engagement of positioning claws 6b and 7b of the diffuser 6 and the scale prism 7. Further, the intermediate casing 5 is formed so that the substantial center portion of the holding concave portion 5a is provided with a boss portion 5d through which the rotor shaft 12a of the drive motor 12 is inserted. The rotor shaft 12a is rotatable about the axis while being inserted into the boss portion 5d. Further, the intermediate casing 5 is provided with a light source hole portion 5e (see FIG. 3 and the like) which exposes the light sources 4 on the circuit board 3 toward the front surface side in the depth direction. The intermediate casing 5 is assembled to the casing 2 through a fixing member such as a screw.

The diffuser 6 is a light transmitting member that diffuses the light emitted from the light source 4 toward the front surface side in the depth direction to the scale prism 7. Typically, the diffuser 6 reduces and scatters the light emitted from the light source 4, and emits the reduced and scattered light toward the scale prism 7. The diffuser 6 is formed in a substantially annular plate shape so as to be accommodated in the holding concave portion 5a, and the outer circumferential portion thereof is provided with the engagement claw 6a and the positioning claw 6b to engage with the engagement concave portion 5b. The diffuser 6 is held by the holding concave portion 5a of the intermediate casing 5 so that the center axis of the annular shape follows the depth direction.

Here, the light source 4 and the diffuser 6 constitute an illumination device 13 which illuminates the scale prism 7 from the rear surface side in the depth direction. The illumination device 13 illuminates the scale prism 7 by the light emitted from the light source 4 and diffused by the diffuser 6. The illumination device 13 emits a predetermined color of light in order to illuminate the scale prism 7 by the light source 4 and the diffuser 6 so that light is emitted therefrom. The illumination device 13 may set the color of emitted light by appropriately setting the color of light emitted from the light source 4 or the color of the diffuser 6 as the light transmitting member. Here, the illumination device 13 emits, for example, light-color white light by emitting white light from the light source 4 and forming the diffuser 6 of white semi-transparent resin. Furthermore, the illumination device 13 may set the color of emitted light by further including a film through which a predetermined color of light is transmitted. Further, the light emitted from the illumination device 13 is not limited to white light, and the other light-color light such as red light, blue light, and green light may be emitted therefrom.

The scale prism 7 is formed of a light transmitting material, and emits light by the light emitted from the light source 4 and diffused by the diffuser 6 (that is, the light emitted from the illumination device 13). The scale prism 7 of the embodiment includes a light guide body 14 and a plurality of protrusion-shaped scales 15. The light guide body 14 and the plurality of protrusion-shaped scales 15 are all formed of a light transmitting material. Here, the light guide body 14 and the plurality of protrusion-shaped scales 15 are integrally formed by dark-color semi-transparent resin. That is, the light guide body 14 and the protrusion-shaped scales 15 are integrated. As an example, the light guide body 14 and the plurality of protrusion-shaped scales 15 are formed of smoke acrylic resin, for example, dark-color resin such as black and deep blue resin. The light guide body 14 is used to guide the light emitted from the light source 4 to the protrusion-shaped scales 15. Similarly to the diffuser 6, the light guide body 14 is formed in a substantially annular plate shape so as to be accommodated in the holding concave portion 5a, and the outer circumferential portion thereof is provided with the engagement claw 7a and the positioning claw 7b to engage with the engagement concave portion 5b. The light guide body 14 is held by the holding concave portion 5a of the intermediate casing 5 so that the center axis of the annular shape follows the depth direction, and the surface at the rear surface side in the depth direction faces the surface at the front surface side in the depth direction of the diffuser 6. The protrusion-shaped scales 15 are provided so as to correspond to the measurement values (here, speed values) displayed in the vehicle instrument 1, and are indicated by the indicating needle 9. The protrusion-shaped scales 15 are formed on the surface at the front surface side in the depth direction in the light guide body 14. The protrusion-shaped scales 15 are formed so as to protrude from the surface at the front surface side in the depth direction of the light guide body 14 toward the front surface side in the depth direction (see FIG. 3 and the like). The protrusion-shaped scales 15 are provided in a substantially circular-arc shape in the surface at the front surface side in the depth direction of the light guide body 14 at the same interval in the outer circumference of the light guide body 14. Furthermore, the shapes and the like of the protrusion-shaped scales 15 will be described in detail later.

The dial plate 8 is used to form a surface (hereinafter, sometimes simply referred to as a "measurement value display surface") 16 that displays the measurement value of the vehicle (see FIG. 2 and the like). The dial plate 8 is formed in a plate shape including an annular portion having an outer diameter substantially equal to those of the diffuser 6 and the light guide body 14. The dial plate 8 is attached to the surface at the front surface side in the depth direction of the light guide body 14 so that the center axis of the annular shape follows the depth direction. In other words, the dial plate 8 covers the surface opposite to the light source 4 of the light guide body 14 (the surface at the front surface side in the depth direction). In the dial plate 8, the surface at the front surface side in the depth direction forms a measurement value display surface 16. The dial plate 8 displays various patterns, symbols, and character strings involved with the measurement value displayed by the vehicle instrument 1 on the measurement value display surface 16. The dial plate 8 is, for example, a sheet formed of polycarbonate cloth, and draws the patterns, the symbols, and the character strings by performing a printing operation on the measurement value display surface 16 by ink of the same color as the scale prism 7 so that the shapes corresponding to the patterns, the symbols, and the character strings are extracted. Here, for example, numerals indicating the speed or auxiliary scales located between the protrusion-shaped scales 15 are drawn as the patterns, the symbols, and the character strings involved with the measurement value displayed by the vehicle instrument 1 on the dial plate 8. When the light emitted from the light source 4 is emitted to the dial plate 8 from the rear surface side in the depth direction so that the light is transmitted through the portions of the patterns, the symbols, and the character strings, the patterns, the symbols, and the character string are displayed by lighting. Further, the dial plate 8 is provided with a notch 8a through which the protrusion-shaped scale 15 is inserted (see FIGS. 1, 2, and 5 and the like). The notch 8a penetrates the dial plate 8 in the depth direction. The notch 8a is provided as many as the plurality of protrusion-shaped scales 15. The notches 8a are formed in the substantially circular-arc shape at the same interval along the outer circumference of the annular portion so that the protrusion-shaped scale 15 is located at a position where the protrusion-shaped scale penetrates the notch. Each of the auxiliary scales is located between the adjacent notches 8a.

The indicating needle 9 is used to indicate a predetermined portion in response to the measurement value displayed by the vehicle instrument 1. The indicating needle 9 is formed in a bar shape by resin, and a rotation shaft 9a is formed at one end side thereof. The indicating needle 9 is assembled to the rotor shaft 12a in a manner such that the rotation shaft 9a is inserted into the boss portion 5d through the inner circumferential surface side of the dial plate 8, the light guide body 14, and the diffuser 6 and the rotor shaft 12a of the drive motor 12 is inserted into the rotation shaft 9a. When the indicating needle 9 is rotationally driven by the drive motor 12, the indicating needle rotates about the rotation axis X at the front surface side in the depth direction of the measurement value display surface 16 so as to indicate, for example, the positions corresponding to the current measurement values (here, the speed values). The protrusion-shaped scale 15 and the auxiliary scale are provided at a plurality of positions along the rotation path of the front end of the indicating needle 9.

The facing member 10 is a frame-shaped member that surrounds the dial plate 8, the light guide body 14, the diffuser 6, and the like and presses the light guide body 14, the diffuser 6, and the like. Here, the facing member 10 of the vehicle instrument 1 serves as the facing member of the entire vehicle display device that employs the vehicle instrument 1. That is, a part of the facing member of the vehicle display device is used as the facing member 10 of the vehicle instrument 1. Further, the facing member 10 is formed of, for example, resin of the same color as the light guide body 14. The facing member 10 includes a circular hole portion 10a as a circular opening used to expose the measurement value display surface 16 of the dial plate 8 to the front surface side in the depth direction. The circular hole portion 10a penetrates the facing member 10 in the depth direction. Here, the inner circumferential surface of the circular hole portion 10a is formed as an inclined surface which is gradually widened from the rear surface side toward the front surface side in the depth direction. Further, the facing member 10 is formed so that a notch 10b is formed at the end of the circular hole portion 10a at the rear surface side in the depth direction (see FIGS. 2, 4, and 5 and the like). The notch 10b is provided as many as the plurality of protrusion-shaped scales 15. The notches 10b are formed at the same interval in the inner circumferential surface of the circular hole portion 10a. As illustrated in FIG. 5 and the like, a part of the protrusion-shaped scale 15 exposed from the notch 8a of the dial plate 8 (the end near the circular hole portion 10a) is inserted into the notch 10b while the facing member 10 covers the circumference of the dial plate 8, the light guide body 14, and the diffuser 6, and a part of each protrusion-shaped scale 15 is accommodated so as to be covered inside the facing member 10. In other words, the facing member 10 is formed so that the end of the circular hole portion 10a at the rear surface side in the depth direction overlaps the end of each protrusion-shaped scale 15 near the circular hole portion 10a (see FIG. 3 and the like). Further, the facing member 10 includes an engagement claw 10c which engages with an engagement concave portion 2a formed in the casing 2. The facing member 10 is assembled to the casing 2 in a manner such that the engagement claw 10c engages with the engagement concave portion 2a.

The annular decoration member 11 is an annular decoration member (ring) attached to the facing member 10. The annular decoration member 11 is formed of, for example, resin or metal, and is assembled to the end of the circular hole portion 10a of the facing member 10 at the front surface side in the depth direction through a double-sided adhesive tape.

In the vehicle instrument 1 with the above-described configuration, the diffuser 6 and the scale prism 7 are stacked and held inside the holding concave portion 5a while the circuit board 3 and the intermediate casing 5 are assembled to the casing 2. In this state, in the vehicle instrument 1, the boss portion 5d is positioned to the inner circumferential surface side of the light guide body 14 and the diffuser 6, and the engagement claws 6a and 7a of the diffuser 6 and the scale prism 7 engage with the engagement concave portion 5b, so that the positioning claws 6b and 7b of the diffuser 6 and the scale prism 7 are positioned to the positioning concave portion 5c. Then, in the vehicle instrument 1, the dial plate 8 is attached to the surface of the light guide body 14 at the front surface side in the depth direction, and the indicating needle 9 is assembled to the rotor shaft 12a of the drive motor 12. In this state, in the vehicle instrument 1, each protrusion-shaped scale 15 protrudes from the notch 8a of the dial plate 8 toward the front surface side in the depth direction. Accordingly, each protrusion-shaped scale 15 is provided so as to protrude from the measurement value display surface 16 which displays the measurement values involved with the vehicle. Then, in the vehicle instrument 1, the facing member 10 is assembled to and integrated with the casing 2 with a positional relation in which the diffuser 6, the scale prism 7, the dial plate 8, and the like are interposed between the intermediate casing 5 and the facing member 10 in the depth direction, and hence the annular decoration member 11 is assembled to the facing member 10. In this state, the vehicle instrument 1 can be visibly recognized from the vehicle interior side while a part of the measurement value display surface 16 of the dial plate 8 or the protrusion-shaped scales 15 are exposed to the front surface side in the depth direction, that is, the vehicle interior side through the circular hole portion 10a of the facing member 10.

For example, when the ignition switch of the vehicle that employs the vehicle instrument 1 is turned on, the light source 4 of the vehicle instrument 1 is turned on so as to emit light. When the light source 4 is turned on, the light emitted from the light source 4 of the vehicle instrument 1 is diffused by the diffuser 6 and is emitted toward the scale prism 7. Then, in the vehicle instrument 1, the light which is incident to the scale prism 7 is guided by the light guide body 14 and is emitted toward the front surface side in the depth direction through the protrusion-shaped scales 15. Accordingly, in the vehicle instrument 1, the protrusion-shaped scales 15 or the patterns, the symbols, and the character strings formed on the dial plate 8 emit light so as to become a display ON state. Then, when the drive motor 12 is rotationally driven in response to, for example, the current measurement value, the indicating needle 9 rotates on the measurement value display surface 16 so as to indicate a predetermined position in response to the protrusion-shaped scales 15 and the auxiliary scales, and hence the vehicle instrument 1 displays the current measurement value (speed). Meanwhile, for example, when the ignition switch of the vehicle is turned off so that the light source 4 is turned off in the vehicle instrument 1, the emission of the light from the protrusion-shaped scales 15 or the patterns, the symbols, and the character strings formed on the dial plate 8 is stopped so as to become a display OFF state.

Incidentally, the protrusion-shaped scale 15 is formed of a light transmitting material, and forms a three-dimensional object 17 which protrudes from the measurement value display surface 16 that displays the measurement values involved with the vehicle. Here, the protrusion-shaped scale 15 as the three-dimensional object 17 is formed so that at least a part thereof is located at the opposite side to the light guide body 14 of the dial plate (the front surface side in the depth direction). The light source 4 emits light to the protrusion-shaped scales 15 as the three-dimensional objects 17 so that light is emitted therefrom.

As illustrated in FIG. 6, the protrusion-shaped scale 15 as the three-dimensional object 17 includes a portion having a different protrusion amount from light incident surface 18 to which light is emitted from the light source 4. Hereinafter, the shapes of the protrusion-shaped scales 15 will be described in detail with reference to FIG. 6. Here, the light incident surface 18 of the protrusion-shaped scale 15 serves as a part of the light incident surface of the light guide body 14 since the light guide body 14 is integrated with the protrusion-shaped scale 15. More specifically, the light incident surface 18 of the protrusion-shaped scale 15 is a light incident surface serving as the light guide body 14, and corresponds to a light incident surface within an area in which the protrusion-shaped scale 15 is projected to the light incident surface in the optical axis direction of the light source 4. Further, the protrusion amount (hereinafter, sometimes simply referred to as the "protrusion amount") from the light incident surface 18 is typically the protrusion amount in the depth direction. More specifically, the protrusion amount corresponds to the protrusion amount in the optical axis direction of the light source 4. Further, in the description below, the side of the rotation axis X will be referred to as the "inside in the radial direction" and the opposite side to the rotation axis X (in other words, the side of the circular hole portion 10a) will be referred to as the "outside in the radial direction" in a direction orthogonal to the rotation axis X.

Specifically, the protrusion-shaped scale 15 as the three-dimensional object 17 has a shape in which the protrusion amount L11 of the portion at the outside in the radial direction is relatively large and the protrusion amount L12 of the portion at the inside in the radial direction is relatively small. Here, the cross-sectional shape of the protrusion-shaped scale 15 in the radial direction is formed as a substantially rectangular upright piece shape. More specifically, the protrusion-shaped scale 15 is formed so that the protrusion amount of an outer radial end 15a is maximal and the protrusion amount of an inner radial end 15b is minimal. Then, an inclined surface 15c is formed so as to connect the outer radial end 15a and the inner radial end 15b to each other at the front surface side in the depth direction. That is, the inclined surface 15c is formed as an inclined surface which is directed toward the front surface side in the depth direction as it goes from the inside in the radial direction toward the outside in the radial direction. The outer radial end 15a and the inner radial end 15b follow a direction substantially orthogonal to the light incident surface 18. The light which is incident from the light incident surface 18 to each protrusion-shaped scale 15 is transmitted through the protrusion-shaped scale 15 and is emitted from the scale surface (mainly the inclined surface 15c) formed by the outer radial end 15a, the inner radial end 15b, and the inclined surface 15c.

Here, the protrusion-shaped scale 15 with the above-described configuration may have a tendency that the attenuation amount of the straight light incident from the light incident surface 18, transmitted through the portion (here, the outer radial portion) having a relatively large protrusion amount, and emitted therefrom relatively increases and the attenuation amount of the straight light incident from the light incident surface 18, transmitted through the portion (here, the inner radial portion), and emitted therefrom relatively decreases. For this reason, in the protrusion-shaped scale 15, the portion having a relatively large protrusion amount is relatively dark, and the portion having a relatively small protrusion amount is relatively bright. Accordingly, there is a concern that unevenness in brightness may occur.

Therefore, as illustrated in FIG. 6, the protrusion-shaped scale 15 as the three-dimensional object 17 of the embodiment can suppress unevenness in brightness by providing a high-diffusion portion 19 in the light incident surface 18 of the portion having a relatively small protrusion amount from the light incident surface 18.

The high-diffusion portion 19 is formed as a portion formed in the light incident surface 18 of the portion having a relatively small protrusion amount from the light incident surface 18 and is formed as a portion having a relatively large diffusion degree for the incident light compared with the light incident surface 18 of the portion having a relatively large protrusion amount from the light incident surface 18. Here, the diffusion degree for the incident light indicates, for example, an index set in response to the ratio of the diffused light with respect to the light incident as the straight light. For example, the diffusion degree can be expressed by the diffusivity of the light. Here, the relative large diffusion degree indicates a state where the amount of the diffused and transmitted light is relatively large, and the relatively small diffusion degree indicates a state where the amount of the diffused and transmitted light is relatively small. Typically, an area provided with the high-diffusion portion 19 in the light incident surface 18 is an area including at least a portion having a minimal protrusion amount, that is, the vicinity of the inner radial end 15*b* at the inside in the radial direction. For example, in an area provided with the high-diffusion portion 19, the light amount of the light emitted from the portion having a relatively small protrusion amount is substantially equal to the light amount of the light emitted from the portion having a relatively large protrusion amount. Thus, a range in which the brightness of the emitted light in the entire protrusion-shaped scale 15 is substantially uniform may be checked by an experiment and may be set later.

In the high-diffusion portion 19 of the embodiment, the surface roughness of the light incident surface 18 of the corresponding portion is set to be different from the surface roughness of the other portion. That is, when the surface becomes relatively rough, the diffusion degree of the light increases relatively. In other words, the high-diffusion portion 19 is formed as a portion in which the surface roughness of the light incident surface 18 of the portion having a relatively small protrusion amount from the light incident surface 18 is relatively larger than the surface roughness of the light incident surface 18 of the portion having a relatively large protrusion amount from the light incident surface 18. In the example of FIG. 6, the high-diffusion portion 19 is formed by a grained surface 20 formed in response to the mold shape when the scale prism 7 including the protrusion-shaped scales 15 is molded. That is, the high-diffusion portion 19 is formed as a portion in which the surface roughness is relatively large, that is, the diffusion degree of the light is relatively large by forming the grained surface 20 in the light incident surface 18 of the portion having a relatively small protrusion amount from the light incident surface 18.

In the vehicle instrument 1 with the above-described configuration, the protrusion-shaped scale 15 as the three-dimensional object 17 protruding from the measurement value display surface 16 that displays the measurement values involved with the vehicle emits light by the light emitted from the light source 4. Here, in the vehicle instrument 1, the high-diffusion portion 19 is formed in the light incident surface 18 of the portion having a relatively small protrusion amount from the light incident surface 18 in each protrusion-shaped scale 15. For this reason, in the vehicle instrument 1, the diffusion degree of the light incident to the light incident surface 18 of the portion having a relatively small protrusion amount in each protrusion-shaped scale 15 is set to be relatively large so that the light amount of the diffused light in the other portion can be increased relatively and the diffusion degree of the light incident to the light incident surface 18 of the portion having a relatively large protrusion amount is set to be relatively small so that the light amount of the diffused light in the other portion can be decreased. Accordingly, the vehicle instrument 1 can be formed so that the light amount of the light emitted from the portion having a relatively small protrusion amount is substantially equal to the light amount of the light emitted from the portion having a relatively large protrusion amount in each protrusion-shaped scale 15. Accordingly, the brightness of the emitted light in the entire protrusion-shaped scale 15 can be substantially uniform.

According to the above-described vehicle instrument 1, the vehicle instrument 1 includes the three-dimensional object 17 (the protrusion-shaped scale 15) which is formed of a light transmitting material and is formed so as to protrude from the measurement value display surface 16 that displays the measurement values involved with the vehicle and the light source 4 which emits light to the three-dimensional object 17. The three-dimensional object 17 includes a portion having a different protrusion amount from the light incident surface 18 to which light emitted from the light source 4 is incident, and the light incident surface 18 of the portion having a relatively small protrusion amount from the light incident surface 18 is provided with the high-diffusion portion 19 having a relatively large diffusion degree for the incident light compared with the light incident surface 18 of the portion having a relatively large protrusion amount from the light incident surface 18.

Accordingly, since the vehicle instrument 1 includes the high-diffusion portion 19 provided in the three-dimensional object 17 (each protrusion-shaped scale 15), the diffusion degree of the light incident to the light incident surface 18 of the portion having a relatively small protrusion amount in the three-dimensional object 17 is set to be relatively large so that the light amount of the diffused light in the other portion can be increased relatively and the diffusion degree of the light incident to the light incident surface 18 of the portion having a relatively large protrusion amount is set to be relatively small so that the light amount of the diffused light in the other portion can be decreased relatively. Accordingly, the vehicle instrument 1 can adjust the brightness of the emitted light to be uniform in the entire three-dimensional object 17. As a result, the vehicle instrument 1 can suppress unevenness in brightness.

According to the above-described vehicle instrument 1, the high-diffusion portion 19 is formed so that the surface roughness of the light incident surface of the portion having a relatively small protrusion amount from the light incident surface 18 is larger than the surface roughness of the light incident surface of the portion having a relatively large protrusion amount from the light incident surface 18. Accordingly, the vehicle instrument 1 can relatively increase the diffusion degree for the light in a manner such that the surface roughness of the light incident surface 18 in the high-diffusion portion 19 becomes relatively rough. That is, the light incident surface 18 of the portion having a relatively small protrusion amount from the light incident surface 18 can be provided with the high-diffusion portion 19 having a diffusion degree for the incident light larger than the light incident surface 18 of the portion having a relatively large protrusion amount from the light incident surface 18.

According to the above-described vehicle instrument 1, the high-diffusion portion 19 is formed by the grained surface 20. Accordingly, the vehicle instrument 1 can form the high-diffusion portion 19 having a relatively large diffusion degree for the light and a relatively large surface roughness degree by forming the grained surface 20 in the light incident surface 18 of the portion having a relatively small protrusion amount from the light incident surface 18.

According to the above-described vehicle instrument 1, the three-dimensional object 17 is the plurality of protrusion-shaped scales 15 which is provided so as to correspond to the measurement values and is indicated by the indicating needle 9. Accordingly, the vehicle instrument 1 can suppress unevenness in brightness when the plurality of protrusion-shaped scales 15 as the three-dimensional objects 17 indicated by the indicating needle 9 emits light.

According to the above-described vehicle instrument 1, the vehicle instrument includes the light guide body 14 which guides the light emitted from the light source 4 to the three-dimensional object 17, and the three-dimensional object 17 and the light guide body 14 are integrally formed of dark-color semi-transparent material. Accordingly, even when the three-dimensional object 17 and the light guide body 14 are formed of a smoke semi-transparent material having a tendency that the brightness becomes uneven in response to the protrusion amount, the vehicle instrument 1 can more remarkably exhibit an effect of suppressing unevenness in brightness by forming the high-diffusion portion 19 as described above.

According to the above-described vehicle instrument 1, the vehicle instrument includes the dial plate 8 which covers the opposite surface to the light source 4 of the light guide body 14, and at least a part of the three-dimensional object 17 is located at the opposite side to the light guide body 14 of the dial plate 8. Accordingly, the vehicle instrument 1 can suppress unevenness in brightness in the three-dimensional object 17 of which at least a part is located at the vehicle interior side of the dial plate 8.

Furthermore, the vehicle instrument according to the above-described embodiment of the invention is not limited to the above-described embodiment, and may be modified into various forms within the scope of claims.

In the description above, a case has been described in which the vehicle instrument 1 includes the vehicle analog speedometer that displays the vehicle travel speed as the measurement value involved with the vehicle, but the invention is not limited thereto. The vehicle instrument 1 may be also, for example, a rotation meter which displays the output rotation speed of the travel power source (for example, an engine or a motor generator) mounted on the vehicle as the measurement values involved with the vehicle. The measurement value involved with the vehicle displayed by the vehicle instrument 1 is not limited to the vehicle travel speed and the output rotation speed of the travel power source, but may be various measurement values of, for example, a cooling water thermometer, a vehicle interior/vehicle exterior thermometer, a vehicle interior/vehicle exterior hygrometer, a vehicle interior/vehicle exterior barometer, and the like. Further, the vehicle instrument 1 may be an instrument which displays an indicating needle image corresponding to the indicating needle 9 on a display such as a liquid-crystal display instead of the indicating needle 9 provided as a physical structure and indicates the measurement value by the indicating needle image.

Further, a case has been described in which the dial plate 8 includes the notch 8a through which the protrusion-shaped scale 15 as the three-dimensional object 17 is inserted, but the invention is not limited thereto. Typically, the three-dimensional object 17 may be located at the front surface side in the depth direction of the dial plate 8. Further, in the description above, a case has been described in which the light source 4 emits light from the rear surface side in the depth direction of the diffuser 6, the scale prism 7, and the dial plate 8, but the invention is not limited thereto. For example, light may be emitted in a direction intersecting the depth direction from the outside in the width direction (the outside in the radial direction) of each of protrusion-shaped scales 15, 315, 415, 515, and 615 as the three-dimensional object 17. Further, a case has been described in which the light guide body 14 and the protrusion-shaped scale 15 as the three-dimensional object 17 are integrally formed of dark-color semi-transparent resin, but the invention is not limited thereto.

In the description above, a case has been described in which the protrusion-shaped scale 15 as the three-dimensional object 17 is formed so that an area with the grained surface 20 is provided with respect to an area without the grained surface 20 in the light incident surface 18. In other words, the high-diffusion portion 19 is formed in response to the existence of the grained surface 20, but the invention is not limited thereto. For example, the high-diffusion portion 19 may be formed in response to the density of the embossed surface of the grained surface 20. That is, the high-diffusion portion 19 is formed so that the density of the embossed surface of the grained surface 20 of the light incident surface 18 of the portion having a relatively small protrusion amount from the light incident surface 18 is higher than the density of the embossed surface of the grained surface 20 of the light incident surface 18 of the portion having a relatively large protrusion amount. Accordingly, the high-diffusion portion may be formed as a portion of which the surface roughness is relatively large, that is, a portion of which the diffusion degree for the light is relatively large.

Further, in the protrusion-shaped scale 15, a surface subjected to a surface treatment such as sand-blasting may be used instead of the grained surface 20 in order to form the high-diffusion portion 19 by setting the surface roughness of the light incident surface 18 of the corresponding portion to be different from the surface roughness of the other portion. That is, the high-diffusion portion 19 may be formed by a surface subjected to a surface treatment such as sand-blasting in the light incident surface 18. That is, the high-diffusion portion 19 may be formed as a portion of which the surface roughness is relatively large, that is, the diffusion degree for the light is relatively large by forming a surface subjected to a surface treatment such as sand-blasting on the light incident surface 18 of the portion having a relatively small protrusion amount from the light incident surface 18.

Further, a case has been described in which the high-diffusion portion 19 is formed by the grained surface 20, but the invention is not limited thereto. For example, as illustrated in a vehicle instrument 201 according to the modified example of FIG. 7, the high-diffusion portion may be formed by, for example, a milky-white (white) ink layer 221. The milky-white ink layer 221 is formed by printing milky-white (white) paint easily diffusing light on the light incident surface 18 of the portion having a relatively small protrusion amount from the light incident surface 18. Even in this case, the vehicle instrument 201 can form the high-diffusion portion 19 having a relatively large diffusion degree for the light by forming the ink layer 221 on the light incident surface 18 of the portion having a relatively small protrusion amount from the light incident surface 18, and hence can suppress unevenness in brightness.

Further, the shape of the protrusion-shaped scale 15 as the three-dimensional object 17 is not limited to the shape described in FIG. 6. For example, the protrusion-shaped scales 315, 415, 515, and 615 as the three-dimensional object 17 may have the shapes illustrated in vehicle instruments 301, 401, 501, and 601 according to the modified examples of FIGS. 8, 9, 10, and 11.

Figure 8:
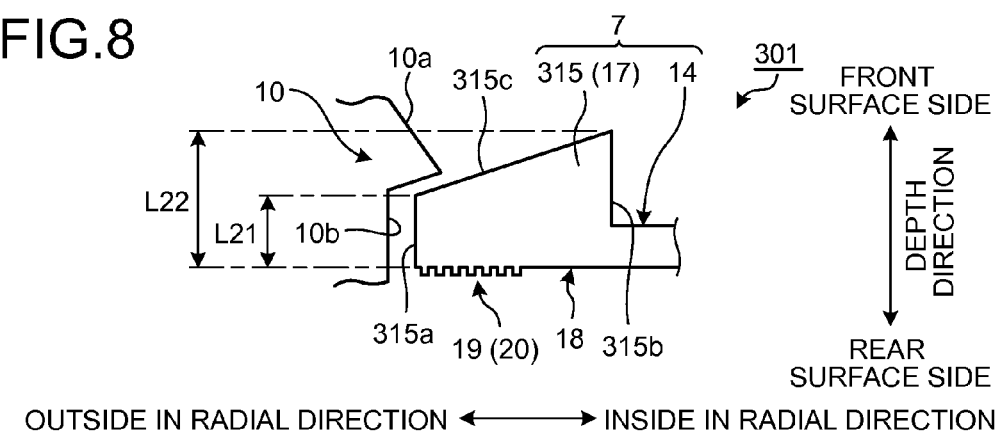
FIG. 8 is a partially cross-sectional view schematically illustrating a three-dimensional object and a high-diffusion portion of the vehicle instrument according to a modified example.

In the protrusion-shaped scale 315 as the three-dimensional object 17 provided in the vehicle instrument 301 illustrated in FIG. 8, the protrusion amount L21 of the outer radial portion is relatively small, and the protrusion amount L22 of the inner radial portion is relatively large. Here, the cross-sectional shape of the protrusion-shaped scale 315 in the radial direction is formed as a substantially rectangular upright piece shape. More specifically, the protrusion-shaped scale 315 is formed so that the protrusion amount of an outer radial end 315a is minimal and the protrusion amount of an inner radial end 315b is maximal. Then, an inclined surface 315c is formed so as to connect the outer radial end 315a and the inner radial end 315b to each other at the front surface side in the depth direction. That is, the inclined surface 315c is formed as an inclined surface which is directed toward the rear surface side in the depth direction as it goes from the inside in the radial direction toward the outside in the radial direction. The outer radial end 315a and the inner radial end 315b follow a direction substantially orthogonal to the light incident surface 18. In this case, an area provided with the high-diffusion portion 19 in the light incident surface 18 is typically an area including at least a portion having a minimal protrusion amount, that is, the vicinity of the outer radial end 315a at the outside in the radial direction.

Figure 9:
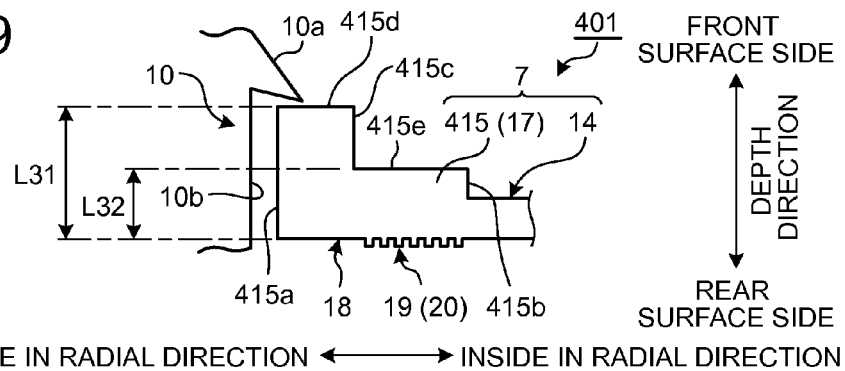
FIG. 9 is a partially cross-sectional view schematically illustrating a three-dimensional object and a high-diffusion portion of the vehicle instrument according to a modified example.

In the protrusion-shaped scale 415 as the three-dimensional object 17 provided in the vehicle instrument 401 illustrated in FIG. 9, the protrusion amount L31 of the outer radial portion is relatively large, and the protrusion amount L32 of the inner radial portion is relatively small. Here, the cross-sectional shape of the protrusion-shaped scale 415 in the radial direction is formed as a substantially stepped upright piece shape. More specifically, the protrusion-shaped scale 415 is formed so that the protrusion amount of an outer radial end 415a is maximal and the protrusion amount of an inner radial end 415b is minimal. Then, a stepped portion 415c is formed between the outer radial end 415a and the inner radial end 415b in the radial direction. Then, in the protrusion-shaped scale 415, a flat surface 415d is formed so as to connect the outer radial end 415a and the stepped portion 415c at the front surface side in the depth direction, and a flat surface 415e is formed so as to connect the inner radial end 415b and the stepped portion 415c. The outer radial end 415a and the inner radial end 415b follow a direction substantially orthogonal to the light incident surface 18. The flat surface 415d and the flat surface 415e are substantially parallel to the light incident surface 18 in an opposed state. In this case, an area provided with the high-diffusion portion 19 in the light incident surface 18 is typically an area including at least a portion having a minimal protrusion amount, that is, the vicinity of the inner radial end 415b and the flat surface 415e at the inside in the radial direction.

Figure 10:
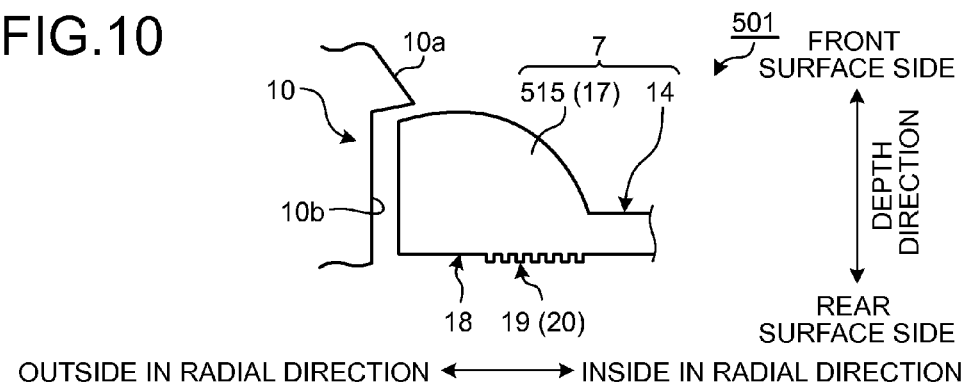
FIG. 10 is a partially cross-sectional view schematically illustrating a three-dimensional object and a high-diffusion portion of the vehicle instrument according to a modified example.

The protrusion-shaped scale 515 as the three-dimensional object 17 provided in the vehicle instrument 501 illustrated in FIG. 10 is formed so that the cross-sectional shape in the radial direction is formed as a curved surface shape in which the protrusion amount in the outer radial portion is relatively large and the protrusion amount in the inner radial portion is relatively small. In this case, an area provided with the high-diffusion portion 19 in the light incident surface 18 is typically an area including at least a portion having a minimal protrusion amount, that is, the vicinity of the inner radial portion.

Figure 11:
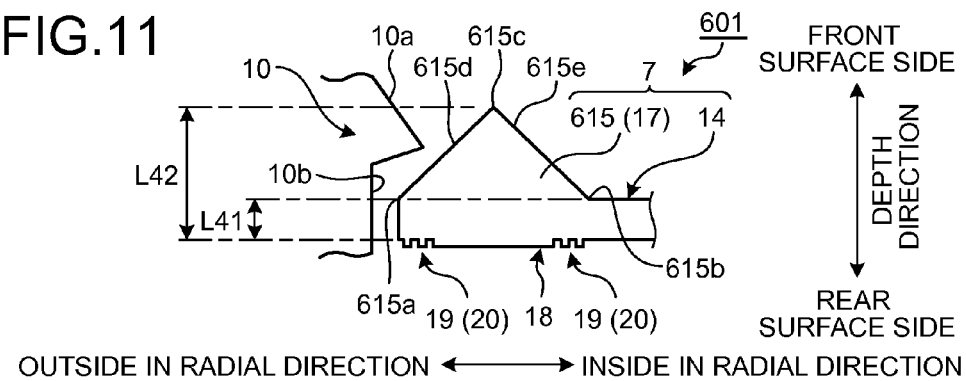
FIG. 11 is a partially cross-sectional view schematically illustrating a three-dimensional object and a high-diffusion portion of the vehicle instrument according to a modified example.

In the protrusion-shaped scale 615 as the three-dimensional object 17 provided in the vehicle instrument 601 illustrated in FIG. 11, the protrusion amount L41 of each of the outer radial portion and the inner radial portion is relatively small, and the protrusion amount L42 of the portion near the center radial portion is relatively large. Here, the cross-sectional shape of the protrusion-shaped scale 615 in the radial direction is formed as a substantially triangular upright piece shape. More specifically, in the protrusion-shaped scale 615, the protrusion amount of each of an outer radial end 615a and an inner radial end 615b is minimal, and the protrusion amount of a ridge portion 615c located between the outer radial end 615a and the inner radial end 615b in the radial direction is maximal. Then, in the protrusion-shaped scale 615, an inclined surface 615d is provided at the front surface side in the depth direction so as to connect the outer radial end 615a and the ridge portion 615c, and an inclined surface 615e is formed so as to connect the inner radial end 615b and the ridge portion 615c. The inclined surface 615d is formed as an inclined surface which is directed toward the front surface side in the depth direction as it goes from the outer radial end 615a toward the ridge portion 615c. The inclined surface 615e is formed as an inclined surface which is directed toward the front surface side in the depth direction as it goes from the inner radial end 615b toward the ridge portion 615c. In this case, an area provided with the high-diffusion portion 19 in the light incident surface 18 is typically an area including at least a portion having a minimal protrusion amount, that is, the vicinity of the outer radial end 615a and the inner radial end 615b.

According to the vehicle instruments 301, 401, 501, and 601, even when the protrusion-shaped scales 315, 415, 515, and 615 have the above-described shapes, unevenness in brightness can be suppressed since the light incident surface 18 of the portion having a relatively small protrusion amount is provided with the high-diffusion portion 19 having a relatively large diffusion degree for the incident light compared with the light incident surface 18 of the portion having a relatively large protrusion amount.

Further, the three-dimensional object 17 is not limited to the protrusion-shaped scale 15. For example, any three-dimensional object may be used as long as the three-dimensional object is formed of a light transmitting material, is formed so as to protrude from the measurement value display surface 16 that displays the measurement values involved with the vehicle, and include a portion having a different protrusion amount from the light incident surface 18.

Figure 12:
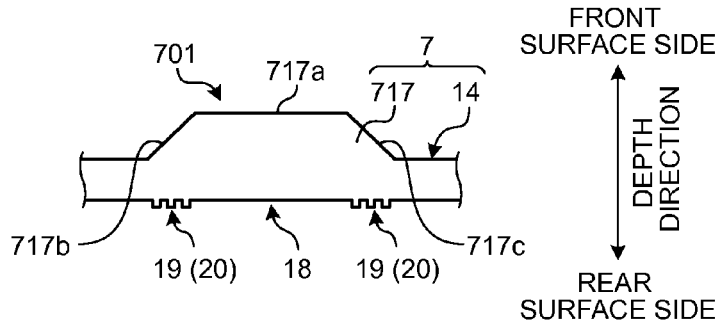
FIG. 12 is a partially cross-sectional view schematically illustrating a three-dimensional object and a high-diffusion portion of the vehicle instrument according to a modified example.

A three-dimensional object 717 provided in a vehicle instrument 701 according to the modified example of FIG. 12 may be, for example, a decoration structure such as an emblem instead of the protrusion-shaped scale 15. The three-dimensional object 717 includes a flat surface 717a which is parallel to the light incident surface 18 in an opposed state and inclined surfaces 717b and 717c which are provided at both ends of the flat surface 717a. In the three-dimensional object 717, the flat surface 717a forms the portion having a relatively large protrusion amount from the light incident surface 18, and each of the inclined surfaces 717b and 717c forms the portion having a relatively small protrusion amount from the light incident surface 18. In this case, an area provided with the high-diffusion portion 19 in the light incident surface 18 is typically an area including the vicinity of the inclined surfaces 717b and 717c including at least a portion having a minimal protrusion amount. According to the vehicle instrument 701, even when the three-dimensional object 717 has the above-described shape, unevenness in brightness can be suppressed since the light incident surface 18 of the portion having a relatively small protrusion amount is provided with the high-diffusion portion 19 having a relatively large diffusion degree for the incident light compared with the light incident surface 18 of the portion having a relatively large protrusion amount.

In the vehicle instrument according to the invention, since the three-dimensional object is provided with the high-diffusion portion, the diffusion degree of the light incident to the light incident surface of the portion having a relatively small protrusion amount in the three-dimensional object is set to be relatively large so that the light amount of the diffused light of the other portion can be increased relatively and the diffusion degree of the light incident to the light incident surface of the portion having a relatively large protrusion amount is set to be relatively small so that the light amount of the diffused light of the other portion can be decreased relatively. Accordingly, the vehicle instrument can adjust the brightness of the emitted light to be uniform in the entire three-dimensional object. As a result, there is an effect that the vehicle instrument can suppress unevenness in brightness.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle instrument comprising:
   a three-dimensional object which is formed of a light transmitting material and is provided so as to protrude from a surface displaying a measurement value involved with a vehicle; and
   a light source configured to emit light to the three-dimensional object, wherein
   the three-dimensional object includes a portion having a different protrusion amount from a light incident surface to which light emitted from the light source is incident, and the light incident surface of a portion having a relatively small protrusion amount from the light incident surface is provided with a high-diffusion portion having a relatively large diffusion degree for the incident light compared with the light incident surface of a portion having a relatively large protrusion amount from the light incident surface.

2. The vehicle instrument according to claim 1, wherein the high-diffusion portion is formed so that a surface roughness of the light incident surface of the portion having a relatively small protrusion amount from the light incident surface is relatively larger than the surface roughness of the light incident surface of the portion having a relatively large protrusion amount from the light incident surface.

3. The vehicle instrument according to claim 2, wherein the high-diffusion portion is composed of a grained surface.

4. The vehicle instrument according to claim 3, wherein the three-dimensional object is a plurality of protrusion-shaped scales provided so as to correspond to the measurement value and indicated by an indicating needle.

5. The vehicle instrument according to claim 4, further comprising:
   a light guide body configured to guide light emitted from the light source to the three-dimensional object, wherein
   the three-dimensional object and the light guide body are integrally formed of dark-color semi-transparent material.

6. The vehicle instrument according to claim 3, further comprising:
   a light guide body configured to guide light emitted from the light source to the three-dimensional object, wherein
   the three-dimensional object and the light guide body are integrally formed of dark-color semi-transparent material.

7. The vehicle instrument according to claim 6, further comprising:
   a dial plate configured to cover a surface opposite to the light source of the light guide body, wherein
   at least a part of the three-dimensional object is located at the opposite side to the light guide body of the dial plate.

8. The vehicle instrument according to claim 2, wherein the three-dimensional object is a plurality of protrusion-shaped scales provided so as to correspond to the measurement value and indicated by an indicating needle.

9. The vehicle instrument according to claim 8, further comprising:
   a light guide body configured to guide light emitted from the light source to the three-dimensional object, wherein
   the three-dimensional object and the light guide body are integrally formed of dark-color semi-transparent material.

10. The vehicle instrument according to claim 2, further comprising:
    a light guide body configured to guide light emitted from the light source to the three-dimensional object, wherein
    the three-dimensional object and the light guide body are integrally formed of dark-color semi-transparent material.

11. The vehicle instrument according to claim 10, further comprising:
    a dial plate configured to cover a surface opposite to the light source of the light guide body, wherein
    at least a part of the three-dimensional object is located at the opposite side to the light guide body of the dial plate.

12. The vehicle instrument according to claim 1, wherein the high-diffusion portion is composed of a grained surface.

13. The vehicle instrument according to claim 12, wherein the three-dimensional object is a plurality of protrusion-shaped scales provided so as to correspond to the measurement value and indicated by an indicating needle.

14. The vehicle instrument according to claim 13, further comprising:
    a light guide body configured to guide light emitted from the light source to the three-dimensional object, wherein
    the three-dimensional object and the light guide body are integrally formed of dark-color semi-transparent material.

15. The vehicle instrument according to claim 12, further comprising:
    a light guide body configured to guide light emitted from the light source to the three-dimensional object, wherein
    the three-dimensional object and the light guide body are integrally formed of dark-color semi-transparent material.

16. The vehicle instrument according to claim 15, further comprising:
    a dial plate configured to cover a surface opposite to the light source of the light guide body, wherein
    at least a part of the three-dimensional object is located at the opposite side to the light guide body of the dial plate.

17. The vehicle instrument according to claim 1, wherein the three-dimensional object is a plurality of protrusion-shaped scales provided so as to correspond to the measurement value and indicated by an indicating needle.

18. The vehicle instrument according to claim 17, further comprising:

a light guide body configured to guide light emitted from the light source to the three-dimensional object, wherein the three-dimensional object and the light guide body are integrally formed of dark-color semi-transparent material.

19. The vehicle instrument according to claim 1, further comprising:

a light guide body configured to guide light emitted from the light source to the three-dimensional object, wherein the three-dimensional object and the light guide body are integrally formed of dark-color semi-transparent material.

20. The vehicle instrument according to claim 19, further comprising:

a dial plate configured to cover a surface opposite to the light source of the light guide body, wherein at least a part of the three-dimensional object is located at the opposite side to the light guide body of the dial plate.

* * * * *